(12) United States Patent
Yokono et al.

(10) Patent No.: US 9,863,347 B2
(45) Date of Patent: Jan. 9, 2018

(54) CONTROL DEVICE FOR INTERNAL COMBUSTION ENGINE AND CONTROL METHOD FOR INTERNAL COMBUSTION ENGINE

(71) Applicant: Mitsubishi Electric Corporation, Tokyo (JP)

(72) Inventors: Michihisa Yokono, Hyogo (JP); Hideki Hagari, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 15/131,068

(22) Filed: Apr. 18, 2016

(65) Prior Publication Data

US 2017/0101949 A1    Apr. 13, 2017

(30) Foreign Application Priority Data

Oct. 7, 2015 (JP) .................. 2015-199138

(51) Int. Cl.
| F02D 41/02 | (2006.01) |
| F02D 37/02 | (2006.01) |
(Continued)

(52) U.S. Cl.
CPC .......... F02D 41/021 (2013.01); F02D 37/02 (2013.01); F02D 41/0002 (2013.01);
(Continued)

(58) Field of Classification Search
CPC .............. F02D 41/021; F02D 41/0002; F02D 41/3005; F02D 41/32; F02D 37/02; F02P 5/15
(Continued)

(56) References Cited

U.S. PATENT DOCUMENTS 4,805,574 A * 2/1989 Sakamoto ............. F02P 5/1528
123/406.55

FOREIGN PATENT DOCUMENTS

| JP | 5222933 A | 8/1993 |
| JP | 8-303293 A | 11/1996 |
(Continued)

OTHER PUBLICATIONS

Communication dated May 31, 2016, from the Japanese Patent Office in counterpart application No. 2015-199138.

*Primary Examiner* — Mahmoud Gimie
(74) *Attorney, Agent, or Firm* — Sughrue Mion, PLLC; Richard C. Turner (57) ABSTRACT

The control device includes an operation state detector, an intake manifold pressure detector, an air humidity detector, an air temperature detector, an atmospheric pressure detector, and a controller that controls the engine output on the basis of detection results of the detectors. The controller generates humidity information on the air which is taken in by the internal combustion engine, from the humidity, temperature, and atmospheric pressure, calculates a dry air partial pressure by correcting the pressure detected by the intake manifold pressure detector, by using the humidity information, and controls the engine output by taking the pressure detected by the intake manifold pressure detector as a wet air pressure and selecting, according to a control element, either one of the wet air pressure and the dry air partial pressure as a pressure to be used for the engine output control.

18 Claims, 4 Drawing Sheets

(51) Int. Cl.
*F02D 41/00* (2006.01)
*F02D 41/30* (2006.01)
*F02D 41/32* (2006.01)
*F02P 5/15* (2006.01)
*F02P 5/04* (2006.01)

(52) U.S. Cl.
CPC ......... *F02D 41/3005* (2013.01); *F02D 41/32* (2013.01); *F02P 5/15* (2013.01); *F02D 2200/0418* (2013.01); *F02P 5/045* (2013.01); *Y02T 10/42* (2013.01); *Y02T 10/46* (2013.01)

(58) Field of Classification Search
USPC ..................................... 701/104; 123/406.23
See application file for complete search history.

(56) References Cited

FOREIGN PATENT DOCUMENTS

| | | |
|---|---|---|
| JP | 2003222050 A | 8/2003 |
| JP | 5328967 B1 | 10/2013 |

* cited by examiner

FIG. 4

CONTROL DEVICE FOR INTERNAL COMBUSTION ENGINE AND CONTROL METHOD FOR INTERNAL COMBUSTION ENGINE

BACKGROUND OF THE INVENTION

1. Field of the Invention

This invention relates to a control device for an internal combustion engine and a control method for an internal combustion engine that correct an intake manifold pressure, which is used for calculating control parameter of the internal combustion engine, for humidity.

2. Description of the Related Art

An engine control method called "torque-based control" in which an engine output shaft torque is used as a value of drive power demanded by a driver or a vehicle and the torque generated by the engine is controlled by taking this engine output shaft torque as an indicator has become popular in recent years.

In the torque-based control, the target torque of the engine is determined on the basis of the depression amount of the accelerator pedal by the driver. The throttle opening degree is then controlled such that a target intake air flow rate enabling the generation of the target torque is taken in by the engine. As a result, the engine output is controlled to the target torque by controlling the fuel injection amount or ignition timing according to the actual intake air flow rate, and the travel performance demanded by the driver is realized.

The following technique has been suggested for an engine control device that controls the throttle opening degree by driving an actuator coupled to the engine throttle in order to realize the target intake air flow rate corresponding to such target torque of the engine. Thus, the target opening area of the throttle is determined by using the target intake air flow rate, the ratio of pressure before and after the throttle, and the opening area of the throttle in a basic formula for flow rate calculation in a restriction-type flowmeter. With this technique, the actuator coupled to the throttle is controlled such as to obtain the throttle opening degree at which the target opening area of the throttle is attained.

In order to control, for example, the fuel injection amount and ignition timing, which are the engine control elements, it is necessary to detect the amount of air taken into the engine. Two systems which are called L-Jetronic and D-Jetronic are generally used for such detection.

In the L-Jetronic system, the amount of air which is taken in is detected by an air flow sensor disposed in an intake channel. The D-Jetronic system estimates the amount of air taken into a cylinder on the basis of the intake manifold pressure downstream of the throttle valve and the engine revolution speed.

The D-Jetronic system is inexpensive because no expensive air flow sensor is needed. Another advantage of the D-Jetronic system is that a fast response to changes in the operation state is ensured by control using the pressure immediately before the cylinder.

A method for calculating the amount of air taken into a cylinder from the pressure and volume efficiency of the intake manifold and the cylinder volume and temperature is a specific example of methods for estimating the cylinder intake air amount in the D-Jetronic system (see, for example, Japanese Patent Application Publication (JP-A) No. H08-303293.

SUMMARY OF THE INVENTION

However, the following problems are associated with the related art. The D-Jetronic system has the above-described merits, but the problem thereof is that the estimation is performed without directly measuring the amount of air which is important in engine control and, therefore, an error occurs in the estimated amount of air.

In the environment in which engines are used, water vapors represented by humidity are typically contained in the air taken in by the engine. Furthermore, the amount of water vapors contained in the air, that is, the humidity varies depending on meteorological conditions and the like. Accordingly, the pressure in the intake manifold which is indicated in JP-A No. H08-303293 includes a pressure created by the water vapors contained in the air, that is, a water vapor partial pressure.

In a gasoline engine, the output is adjusted by the amount of air supplied to cylinders. This amount of air is adjusted by adjusting the opening degree of a throttle valve provided in the intake channel to the cylinder. A fuel such as gasoline is mixed with the air supplied to the cylinder, the gas mixture compressed by the piston is ignited, and the increase in pressure generated by the combustion of the gas mixture is the engine output.

Of the amount of air taken into the cylinder, only the dry air, excluding the water vapors contained in the air, takes part in the combustion. The resultant problem is that even when the amount of wet air supplied to the cylinder is the same, the engine output differs depending on the humidity of the wet air, that is, the amount of water vapor. In the D-Jetronic system, the water vapor partial pressure causes an error.

A method for reducing the intake air amount calculation error when an intake VVT or exhaust VVT is changed in the D-Jetronic system has been suggested to resolve this problem (see, for example, Japanese Patent No. 5328967). However, since the correction for the humidity is also not performed in Japanese Patent No. 5328967, an error relating to the humidity component is present at all times.

The present invention has been created to resolve the above-mentioned problems, and it is an objective of the present invention to provide a control device for an internal combustion engine and a control method for an internal combustion engine that can accurately control the engine output without being affected by humidity, and can increase the accuracy of engine control, such as exhaust gas purification, while accurately controlling the torque demanded by the driver.

The control device for an internal combustion engine in accordance with the present invention includes: an operation state detector that detects an operation state of an internal combustion engine; an intake manifold pressure detector that detects a pressure in an intake manifold downstream of a throttle valve provided in an intake channel of the internal combustion engine; an air humidity detector that detects a humidity of air taken in by the internal combustion engine; an air temperature detector that detects the temperature of the air; an atmospheric pressure detector that detects an ambient pressure of the internal combustion engine as an atmospheric pressure; and a controller that controls an engine output on the basis of detection results of the detectors, wherein the controller: generates humidity information on the air which is taken in by the internal combustion engine, from the humidity detected by the air humidity detector, the temperature detected by the air temperature detector, and the atmospheric pressure detected by the atmospheric pressure detector; calculates a dry air partial pressure by correcting the pressure detected by the intake manifold pressure detector, by using the generated humidity information; and controls the engine output by taking the pressure detected by the intake manifold pressure detector as a wet air pressure and selecting, according to a control element, either one of the wet air pressure and the dry air partial pressure as a pressure to be used for controlling the engine output.

The control method for an internal combustion engine in accordance with the present invention is to be executed by a controller in a control device for an internal combustion engine, the control device including: an operation state detector that detects an operation state of an internal combustion engine; an intake manifold pressure detector that detects a pressure in an intake manifold downstream of a throttle valve provided in an intake channel of the internal combustion engine; an air humidity detector that detects a humidity of air taken in by the internal combustion engine; an air temperature detector that detects the temperature of the air; an atmospheric pressure detector that detects an ambient pressure of the internal combustion engine as an atmospheric pressure; and the controller that controls an engine output on the basis of detection results of the detectors, the control method including the following steps executed by the controller: a first step for generating humidity information on the air which is taken in by the internal combustion engine, from the humidity detected by the air humidity detector, the temperature detected by the air temperature detector, and the atmospheric pressure detected by the atmospheric pressure detector; a second step for calculating a dry air partial pressure by correcting the pressure detected by the intake manifold pressure detector by using the humidity information generated in the first step; and a third step for controlling the engine output by taking the pressure detected by the intake manifold pressure detector as a wet air pressure and selecting, according to a control element, either one of the wet air pressure and the dry air partial pressure as a pressure to be used for controlling the engine output.

The present invention provides the configuration in which the intake manifold pressure is taken as a wet air pressure, the pressure obtained by correcting, by using the humidity information, the effect produced by humidity on the intake manifold pressure is calculated as the dry air partial pressure, and the pressure information to be used for the control is switched, as appropriate, between the wet air pressure and dry air partial pressure according to the engine control element. As a result, it is possible to provide a control device for an internal combustion engine and a control method for an internal combustion engine that can accurately control the engine output without being affected by humidity, and can increase the accuracy of engine control, such as exhaust gas purification, while accurately controlling the torque demanded by the driver.

DETAILED DESCRIPTION OF THE PREFERRED EMBODIMENTS

The preferred embodiments of the control device for an internal combustion engine and the control method for an internal combustion engine in accordance with the present invention will be explained hereinbelow with reference to the drawings.

Embodiment 1

Figure 1:
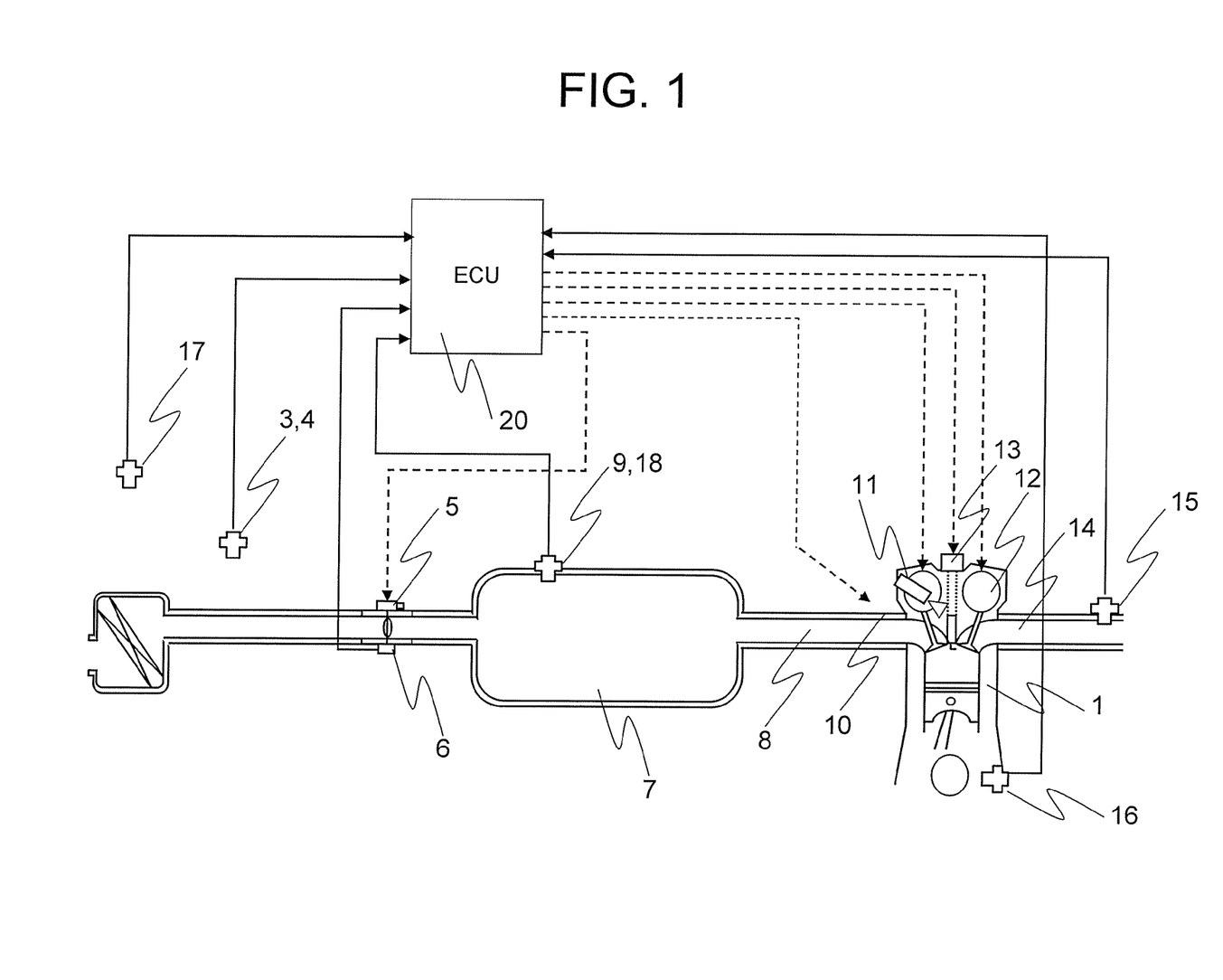
FIG. 1 is a configuration diagram illustrating schematically an internal combustion engine control device according to Embodiment 1 of the present invention.

FIG. 1 is a configuration diagram illustrating schematically an internal combustion engine control device according to Embodiment 1 of the present invention. In FIG. 1, an electronically controlled throttle 5 that can be electrically controlled to adjust the intake air amount is provided upstream of an intake system of an engine 1. A throttle opening degree sensor 6 is provided for measuring the opening degree of the electronically controlled throttle 5.

Provided also are an intake manifold pressure sensor 9 that measures a pressure (referred to hereinbelow as "intake manifold pressure") in a space including the interiors of a surge tank 7 and an intake manifold 8 (this space is referred to hereinbelow as "intake manifold") downstream of the throttle 5, and an intake manifold temperature sensor 18 that measures the air temperature inside the intake manifold.

Provided outside the engine are an atmospheric pressure sensor 17 for detecting the atmospheric pressure which is the ambient pressure of the engine, a temperature sensor 3 for detecting the ambient temperature, and a humidity sensor 4 for detecting the ambient humidity. Those temperature sensor 3 and humidity sensor 4 may be also provided at the engine intake channel or internal manifold.

A method may be also used by which the ambient pressure, ambient temperature, and ambient humidity are obtained by communicating information measured by other devices, such as an air conditioner. When the temperature sensor 3 and the humidity sensor 4 are installed at the intake manifold, either one of the temperature sensor 3 and the intake manifold temperature sensor 18 can be omitted to avoid measuring the temperature in the same location.

The humidity sensor 4 is generally of an electric resistant type in which humidity is detected by the electric resistance of a moisture-sensitive material or an electrostatic capacitance type in which the humidity is detected by the electrostatic capacitance of a sensor element. The humidity detected by the humidity sensor 4 is a relative humidity, regardless of the detection type thereof. The relative humidity, as referred to herein, represents the ratio of the water vapor partial pressure of the air to the saturated water vapor pressure determined by the air temperature, and even when the water vapor partial pressure in the air is the same, the relative humidity changes depending on the temperature.

An injector 10 for fuel injection is provided in the vicinity of an intake valve including the interior of a cylinder and the intake manifold 8. The intake valve and an exhaust valve are each provided with an intake VVT 11 and an exhaust VVT 12 for varying the valve timing. An ignition coil 13 for driving an ignition plug that generates a spark inside a cylinder is provided at the cylinder head.

An air-fuel ratio sensor 15 and a catalyst (not depicted in the figure) are provided at the exhaust manifold 14. Only one of the intake VVT 11 and the exhaust VVT 12 can be provided, and in some cases, none of them can be provided.

Information on detection signals from a crank angle sensor 16 that detects a crank angle or engine revolution speed, the above-described sensors, and other sensors which are not depicted in the figure, and information such as ignition S/W (referred to hereinbelow as "IG-S/W") which is a start S/W of the engine are inputted as information indicating the operation state of the engine 1 into an electronic control unit (referred to hereinbelow as "ECU") 20 constituted by a microcomputer or an interface circuit.

The ECU 20, which corresponds to a controller, calculates a target torque from the data indicating the inputted operation state and calculates the target intake air flow rate at which the calculated target torque is attained. The ECU 20 also calculates a target effective opening area and determines a target throttle opening degree by the below-described method so as to attain the target intake air flow rate.

The ECU 20 also controls the opening degree of the electronically controlled throttle 5 such as to attain the target throttle opening degree. At the same time, the ECU 20 calculates instruction values to actuators including the injector 10, the intake VVT 11, the exhaust VVT 12, and the ignition coil 13.

Figure 2:
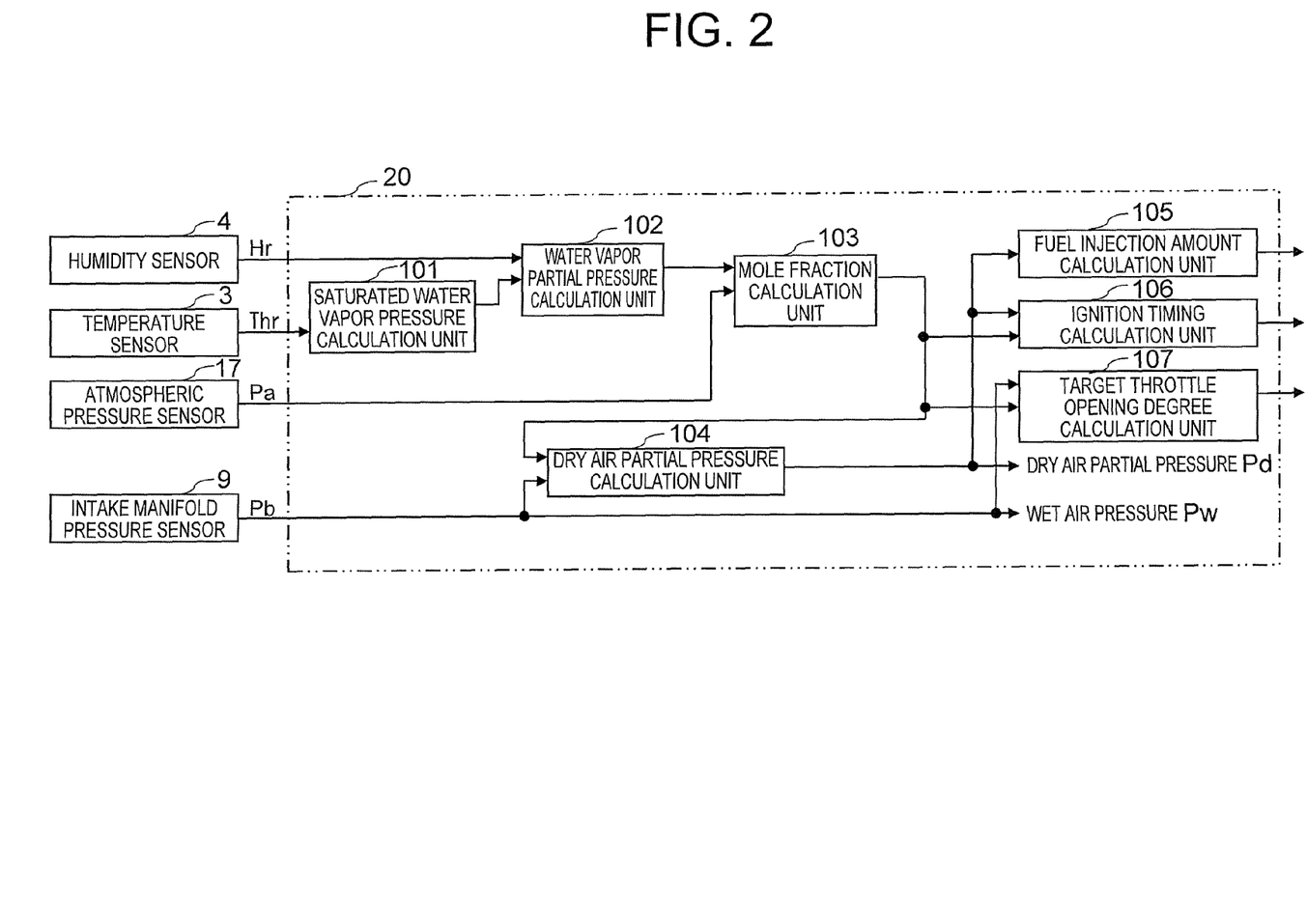
FIG. 2 is a block diagram illustrating the schematic configuration of an ECU according to Embodiment 1 of the present invention.

The configuration of the ECU 20 of the engine control device according to Embodiment 1 will be described hereinbelow in greater detail with reference to FIG. 2. FIG. 2 is a block diagram illustrating the schematic configuration of an ECU 20 according to Embodiment 1 of the present invention.

The ambient temperature Thr detected by the temperature sensor 3, the relative humidity Hr of the ambient air which has been detected by the humidity sensor 4, the atmospheric pressure Pa detected by the atmospheric pressure sensor 17, and the intake manifold pressure Pb detected by the intake manifold pressure sensor 9 are inputted as information indicating the operation state to the ECU 20.

The ECU 20 is configured to include a saturated water vapor pressure calculation unit 101, a water vapor partial pressure calculation unit 102, a mole fraction calculation unit 103, a dry air partial pressure calculation unit 104, a fuel injection amount calculation unit 105, an ignition timing calculation unit 106, and a target throttle opening degree calculation unit 107.

The saturated water vapor pressure calculation unit 101 inputs the ambient temperature Thr and calculates a saturated water vapor pressure Ps. The saturated water vapor pressure, as referred to herein, is a pressure of water vapor when the water vapor is in a saturated state at a certain temperature. It is generally known that the saturated water vapor pressure can be calculated as a function of temperature by the Tetens's formula represented by Expression (1) below. In Expression (1) below, T is a temperature (° C.); in the saturated water vapor pressure calculation unit 101, the intake temperature Thr is indicated.

$$P_S = 6.1078 \times 10^{\left(\frac{7.5 \times T}{T + 237.3}\right)}[hPa] \quad (1)$$

When the effect of index calculation on processing load causes concern in the calculation capacity of the ECU 20, the calculation may be performed by table setting using the temperature, instead of calculating by Expression (1) above.

The water vapor partial pressure calculation unit 102 inputs the saturated water vapor pressure Ps and the relative humidity Hr and calculates the water vapor partial pressure Pv. The water vapor partial pressure, as referred to herein, is a pressure created by water vapor contained in the gas. The relationship thereof with the saturated water vapor pressure Ps is represented by Expression (2) below. In Expression (2) below, H is a relative humidity (% RH); in the water vapor partial pressure calculation unit 102, the relative humidity Hr is indicated.

$$P_v = P_S \times \frac{H}{100}[hPa] \quad (2)$$

The mole fraction calculation unit 103 inputs the atmospheric pressure Pa and water vapor partial pressure Pv and calculates the mole fraction $\chi v$. The mole fraction, as referred to herein, corresponds to humidity information indicating the ratio of the number of moles of water vapor and wet air, that is, the ratio of amounts of substances. The mole fraction $\chi v$ is the ratio of the amounts of substances of water vapor and wet air. Since the ratio of amounts of substances is equal to the ratio of pressures according to a generally known Dalton's law, the mole fraction $\chi v$ is represented by Expressions (3) to (5) below.

In Expressions (3) to (5) below, nv is the amount of the substance of water vapor, nd is the amount of the substance of wet air, Mv is the molecular weight of water vapor, Md is the molecular weight of dry air, mv is the mass of water vapor, and and is the mass of dry air.

$$n_v = \frac{m_v}{M_v} \quad (3)$$

$$n_w = n_v + n_d = \frac{m_v}{M_v} + \frac{m_d}{M_d} \quad (4)$$

$$\chi_v = \frac{n_v}{n_v + n_d} = \frac{P_v}{P_a} \quad (5)$$

The dry air partial pressure calculation unit 104 inputs the intake manifold pressure Pb, that is, the wet air pressure Pw, and the mole fraction $\chi v$ corresponding to the humidity information and calculates the dry air partial pressure Pd. The engine obtains the output by combustion of the mixed gas of air and gasoline inside the cylinders, but this combustion is caused by the dry air taken into the cylinders. Therefore, the amount of dry air is obtained by subtracting the water vapor fraction from the amount of air taken into the cylinders.

When the intake air amount is restricted in the throttle valve 5, the pressure downstream of the throttle valve becomes lower than the ambient atmospheric pressure, but the ratio of the amount of dry air and the amount of water vapor in the wet air which is taken in is the same as before passing the throttle valve. Therefore, the share of pressure created by the dry air in the intake manifold pressure is represented by Expression (6) below from the relationship represented by Expression (5) above. Here, Pd is the dry air partial pressure.

$$P_d = (1 - \chi_v) \times P_w \quad (6)$$

Fuel control or ignition control with the L-Jetronic system is generally performed by using a computational formula or a preset map on the basis of the amount of air detected with the air flow sensor and the engine filling efficiency calculated from the amount of air and the engine revolution speed.

Meanwhile, with the D-Jetronic system, fuel control or ignition control is performed by calculations from the intake manifold pressure and engine revolution speed by using a preset map, or by a method similar to that of the L-Jetronic system in which the intake air amount is calculated, for example, from the computational formula indicated in JP-A No. H08-303293 by using the intake manifold pressure.

The fuel injection amount calculation unit 105 and the ignition timing calculation unit 106 are explained below by considering a method in which control is performed using the intake air amount calculated from the intake manifold pressure. The intake air amount Qvth in this case is calculated from the intake manifold pressure, for example, by Expression (7) below. Here, P is an intake manifold pressure, Kv is a volume efficiency correction coefficient, Vcyl is a cylinder volume, Tsgt is a period between reference crank angles which is used for engine control, R is a gas constant, and Tb is an intake manifold temperature.

$$Q = \frac{P \times K_v \times V_{cyl}}{T_{sgt} \times R \times T_b} \quad (7)$$

For example, the volume efficiency correction coefficient Kv is calculated from the engine revolution speed and intake manifold pressure. Thus, the results measured in advance are set as a map, and correction coefficients of volume efficiency are indicated for a variety of operation conditions determined by the engine revolution speed and intake manifold pressure.

In the related art, Pb, that is, Pw which is the wet air pressure, has been used as the intake manifold pressure in Expression (7), which resulted in an error caused by humidity. By contrast, in the present Embodiment 1, the amount Qd of dry air can be calculated by using the dry air partial pressure Pd calculated with Expression (6) above. As a result, the error caused by humidity can be eliminated.

The fuel injection amount calculation unit 105 inputs the dry air partial pressure Pd and operation information of various types and calculates and outputs the fuel injection amount, that is, the drive amount of the injector 10. It is a generally well-known technique to calculate the fuel injection amount realized by the injector 10 under the engine control on the basis of the target ratio (referred to hereinbelow as A/F) of the air mass and fuel mass in the operation state and the intake air amount during the operation.

Accordingly, in Embodiment 1, the amount of fuel which is optimum for realizing the target A/F can be calculated by using the amount Qd of dry air, which contributes to combustion, as the amount of air to be used for calculating the fuel injection amount.

A catalyst serving to purify the exhaust gas is typically installed in the engine exhaust channel, and the combustion state with a stoichiometric A/F of 14.7 is suitable for exhaust gas purification with the catalyst. Since the A/F can be accurately realized by calculating the amount of fuel from the amount of dry air, the shift in the amount of fuel, that is, the A/F, which is caused by the effect of humidity, can be suppressed and the deterioration of exhaust gas can be improved.

The ignition timing calculation unit 106 inputs the amount Qd of dry air and the mole fraction $\chi v$ and calculates and outputs the ignition timing, that is, the drive timing of the ignition coil 13. It is a generally well-known technique to calculate the ignition timing for the ignition coil 13 and ignition plug in engine control on the basis of the engine revolution speed and filling efficiency. The optimum ignition timing at each engine revolution speed and filling efficiency is measured in advance and stored as a map inside the ignition timing calculation unit 106.

The optimum ignition timing, as referred to herein, is generally the ignition timing retarded from both the minimum advance for the best torque (MBT) ignition timing and the critical ignition timing at which knocking does not occur. In Embodiment 1, the optimum ignition timing in the operation state can be calculated by using the amount Qd of dry air which contributes to the combustion also for calculating the filling efficiency to be used for ignition timing calculation.

Figure 3:
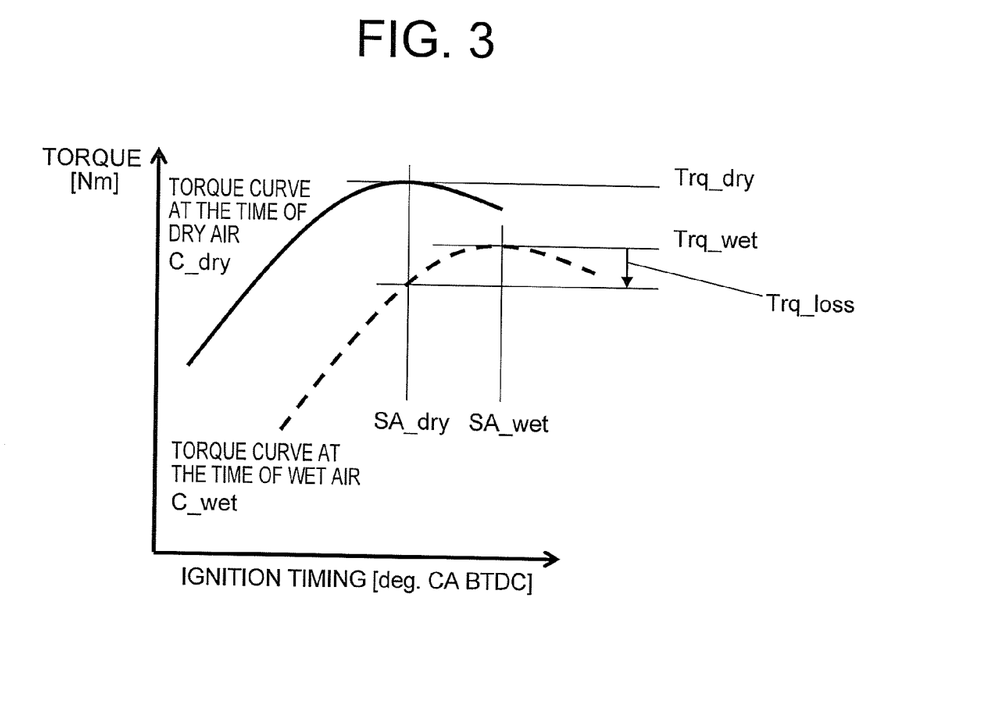
FIG. 3 illustrates a torque curve in a certain operation state of Embodiment 1 of the present invention.

FIG. 3 illustrates a torque curve in a certain operation state of Embodiment 1 of the present invention. The torque curve, as determined herein, is a curve representing the relationship between the ignition timing and the torque generated by the engine when the engine revolution speed and throttle opening degree in the operation state of the engine, that is, the intake air amount, A/F, and in some engine system configurations the operation timing of the intake valve and the operation timing of the exhaust valve, are all constant and only the ignition timing is changed.

In the curve which curves out upward, the ignition timing at which the torque is at a maximum is referred to as the aforementioned MBT. For example, the torque curve C_dry represented by a solid line in the FIG. 3 is calculated in a state in which the air taken in by the engine is dry at certain engine revolution speed and filling efficiency. The MBT at this time is SA_dry, and the torque generated by the engine at the MBT is Trq_dry.

The curve C_wet represented by a broken line is obtained by increasing the air humidity and measuring the torque curve at a high-humidity air intake while the mass flow rate of the air taken into the engine remains constant. The MBT at this time is SA_wet, and the torque generated by the engine at the MBT is Trq_wet.

As depicted in FIG. 3, due to increase in humidity, the output torque decreases and the MBT advances with respect to those when the air is dry. This is because the increase in humidity decreases the amount of dry air taken in by the engine. The torque curve C_wet measured with the high-humidity air has been confirmed to represent the same characteristic as when the throttle valve is closed to reduce the intake air amount during the operation with the dry air.

In other words, by calculating the filling efficiency, which is used for calculating the ignition timing, on the basis of the amount of dry air, it is possible to perform the control by the ignition timing in the correct engine output characteristic.

Where the ignition timing map is to be measured and set with the dry air, with the conventional control involving no correction for humidity, even when the C_wet characteristic is realized during the high-humidity operation, the ignition timing is calculated as SA_dry. Therefore, the ignition is retarded from the MBT in the engine characteristic.

As a result, a torque loss such as Trq_loss depicted in FIG. 3 occurs and fuel efficiency is degraded. By contrast in Embodiment 1, the ignition timing is calculated based on the filling efficiency at the amount of dry air as a result of correction for humidity. As a consequence, the ignition at the SA_wet, which is the MBT, becomes possible, and the resultant effect is that the fuel efficiency can be improved by comparison with that attained with the conventional control.

Figure 4:
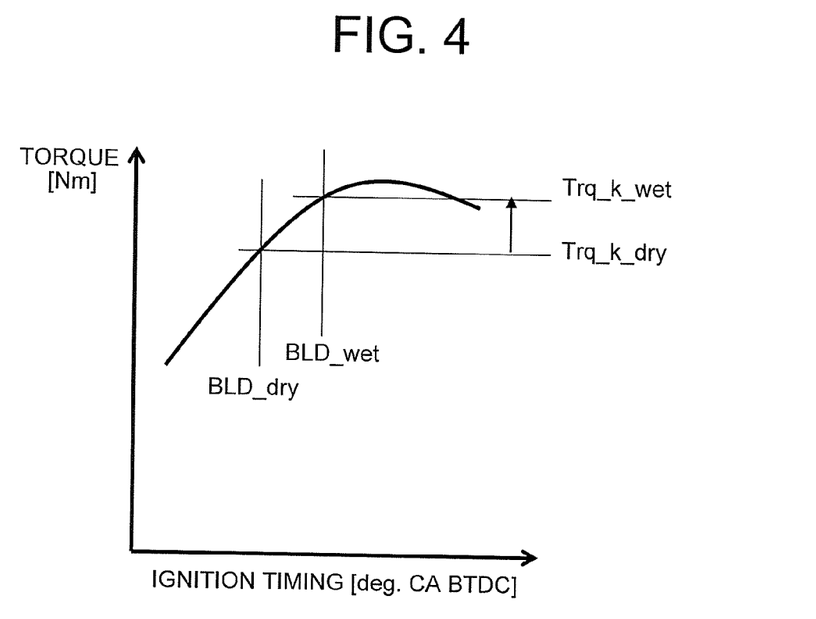
FIG. 4 illustrates a torque curve in a certain operation state, which is different from that depicted in FIG. 3, and a knocking limit in Embodiment 1 of the present invention.

FIG. 4 illustrates a torque curve in a certain operation state, which is different from that depicted in FIG. 3, and a knocking limit in Embodiment 1 of the present invention. In the dry air, where the ignition timing is advanced to a BLD_dry, the knocking phenomenon occurs at a level that cannot be allowed where the engine performance and durability are taken into account. Thus, the BLD_dry indicates the ignition timing at the knocking limit, and the torque generated by the engine at this time is Trq_k_dry.

The knocking limit is an ignition timing retarded from the MBT, and a knocking limit value on the retard side, or a value which is further retarded with consideration for the spread among the engines and environmental conditions, is set on the ignition timing map. It has been generally confirmed that in the high-load operation region of the engine, the knocking limit tends to be retarded from the MBT.

Where similar measurements are performed in a high-humidity intake air state, since the combustion rate inside the cylinder is reduced by water vapors, the ignition timing of the knocking limit changes to a BLD_wet which is on the advance side, and the torque generated by the engine at this time rises to the Trq_k_wet.

In other words, with the operation in which the knocking limit, rather than the MBT, is set at the ignition timing map, the ignition timing can be further advanced during the high-humidity operation. As a result of the ignition timing being further advanced, the fuel efficiency can be improved.

Even when the ignition timing in a high-humidity state is calculated using the amount of dry air, an additional advance is made possible with the operation state in which the knocking limit is set at the ignition timing map. This result indicates that the additional improvement in fuel efficiency can be attained by using the humidity information to calculate the corrected value on the advance side and correct the ignition timing calculated from the map.

The correction value, that is, the advance amount, increases as the humidity rises. Therefore, it is possible to store in advance the humidity information, for example, the relationship between the mole fraction χv and the advance amount, as a map and calculate the advance amount by using this map. Further, with consideration for the engine characteristics, the knocking limit is set at the ignition timing map for the high-load operation state. Accordingly, the correction of the advance amount for the humidity may be performed only in the high-load region.

Returning to the explanation of FIG. 2, the target throttle opening degree calculation unit 107 takes the intake manifold pressure Pb, that is, the wet air pressure Pw, and the mole fraction χv as inputs and calculates and outputs the target throttle opening degree for realizing the target intake air amount.

As for the air amount determined by the throttle 5 in the engine control, the target throttle opening degree is determined, as mentioned hereinabove, for example, by calculating the target torque from the inputted data, calculating the target intake air flow rate at which the calculated target torque is reached, and calculating the target effective opening area such that the target intake air flow rate is reached. The relationship between the intake air amount and effective opening area is represented by Expression (8) below.

Here, the intake air amount Qvth is a volume flow rate, α0 is the sound velocity of the intake air, Sth is the effective opening area of the throttle, κ is the specific heat ratio of the intake air, and Pup is a pressure upstream of the throttle valve. In the present invention, the atmospheric pressure Pdwn is the intake manifold pressure which is the pressure downstream of the throttle valve.

$$Q_{vth} = \alpha 0 \times S_{th} \times \sqrt{\frac{2}{\kappa - 1} \times \left\{ \left(\frac{P_{dwn}}{P_{up}}\right)^{\frac{2}{\kappa}} - \left(\frac{P_{dwn}}{P_{up}}\right)^{\frac{\kappa+1}{\kappa}} \right\}} \quad (8)$$

Where the Expression (8) above is rewritten as the effective opening area Sth, Expression (9) below is obtained. Here, σ is a dimensionless flow rate changing according to a pressure ratio Pdwn/Pup. Where the pressure ratio Pdwn/Pup is equal to or less than a critical pressure ratio (in the case of air, a value corresponding to about 0.528), the dimensionless flow rate σ at the time of the critical pressure ratio is a constant value represented by Expression (10) below.

$$S_{th} = \frac{Q_{vth}}{\alpha 0 \times \sigma} \quad (9)$$

$$\sigma = \sqrt{\frac{2}{\kappa - 1} \times \left\{ \left(\frac{P_{dwn}}{P_{up}}\right)^{\frac{2}{\kappa}} - \left(\frac{P_{dwn}}{P_{up}}\right)^{\frac{\kappa+1}{\kappa}} \right\}} \quad (10)$$

A model using a physical computational formula may be used for calculating the opening degree of the throttle from the effective opening area on the basis of the throttle valve shape, or values calculated in advance on the basis of calculation and actual measurement results may be stored as a map and the opening degree may be calculated using the map.

The target intake air amount which is calculated from the target torque needs to be calculated based on the dry air contributing to combustion. Meanwhile, the amount of air used for the throttle opening degree calculation needs to be calculated by the total amount of air passing through the throttle, that is, the amount of wet air. The flow rate Qvth represented by Expression (8) above is a volume flow rate, but the ratio of the number of moles is the same as the volume ratio. Therefore, in Expression (11) below, the volume flow rate Qvw of the wet air can be calculated from the mole fraction χv and the volume flow rate Qvd of the dry air.

$$Q_{vw} = \frac{Q_{vd}}{1 - \chi_v} \quad (11)$$

Thus, the amount of air for realizing the target torque can be accurately calculated without affecting the humidity state of the environment. It is generally well known that the conversion between the mass flow rate and volume flow rate of the air can be performed by using the density of air.

Thus, the degradation of exhaust gas can be suppressed and the engine output torque can be accurately controlled, while improving the fuel efficiency, by adequately switching the pressure to be used between the dry air partial pressure and wet air pressure with the control element.

Figure 5:
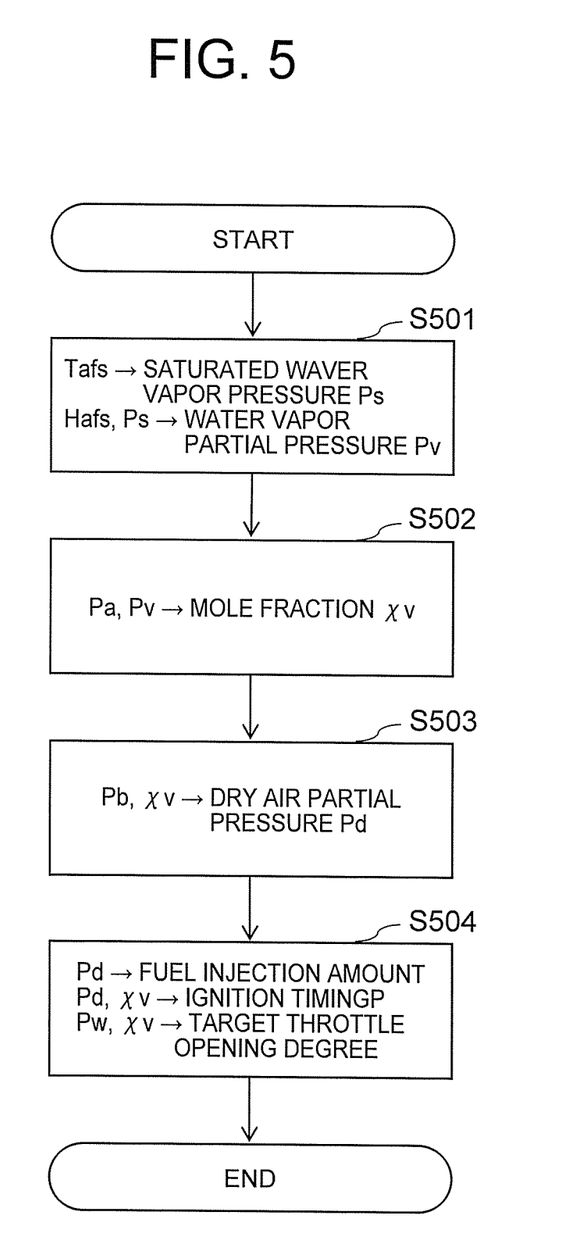
FIG. 5 is a flowchart illustrating the processing sequence in the control method for an internal combustion engine which is executed by the ECU in Embodiment 1 of the present invention.

The control processing sequence in Embodiment 1 will be explained hereinbelow by using a flowchart. FIG. 5 is a flowchart illustrating the processing sequence in the control method for an internal combustion engine which is executed by the ECU 20 in Embodiment 1 of the present invention. The processing represented by the flowchart depicted in FIG. 5 is repeatedly executed by a computational processing device located in the ECU 20 for each predetermined computational period by executing the software (program) stored in the storage device.

Initially, in step S501, the ECU 20 performs the processing of the saturated water vapor pressure calculation unit 101 and the water vapor partial pressure calculation unit 102. More specifically, the saturated water vapor pressure Ps is calculated from the intake temperature Tafs by the processing of the saturated water vapor pressure calculation unit 101, and the water vapor partial pressure Pv is calculated from the relative humidity Hafs and the saturated water vapor pressure Ps by the processing of the water vapor partial pressure calculation unit 102.

Then, in step S502, the ECU 20 performs the processing of the mole fraction calculation unit 103. More specifically, the mole fraction $\chi v$ corresponding to the humidity information is calculated from the atmospheric pressure Pa and the water vapor partial pressure Pv by the processing of the mole fraction calculation unit 103.

Then, in step S503, the ECU 20 performs the processing of the dry air partial pressure calculation unit 104. More specifically, the dry air partial pressure Pd is calculated from the intake manifold pressure sensor Pb and the mole fraction $\chi v$ by the processing of the dry air partial pressure calculation unit 104.

Then, in step S504, the ECU 20 performs the processing of the fuel injection amount calculation unit 105, the ignition timing calculation unit 106, and the target throttle opening degree calculation unit 107. More specifically, the fuel injection amount is calculated from the dry air partial pressure Pd by the processing of the fuel injection amount calculation unit 105, the ignition timing is calculated from the dry air partial pressure Pd or the dry air partial pressure Pd and the mole fraction $\chi v$ by the processing of the ignition timing calculation unit 106, and the target throttle opening degree is calculated from the wet air pressure Pw and the mole fraction $\chi v$ by the processing of the target throttle opening degree calculation unit 107.

As described hereinabove, the control device for an internal combustion engine according to Embodiment 1 is configured to perform the correction of the wet air pressure which is affected by the humidity, calculating the dry air partial pressure from the wet air pressure after the correction, and switching the pressure to be used to either one of the wet air pressure and dry air partial pressure with the element of engine control.

More specifically, the pressure to be used is switched such that the dry air partial pressure is used when the fuel injection amount and ignition timing are calculated, and the wet air pressure is used when the target throttle opening degree is calculated. Thus, the humidity information is used with respect to the ignition timing, and when the humidity is high, the ignition timing is corrected to the advance side.

As a result, it is possible to realize a control device for an internal combustion engine and a control method for an internal combustion engine that can suppress the degradation of exhaust gas and accurately control the engine output, while improving the fuel efficiency.

What is claimed is:

1. A control device for an internal combustion engine, the control device comprising:
    an operation state detector that detects an operation state of an internal combustion engine;
    an intake manifold pressure detector that detects a pressure in an intake manifold downstream of a throttle valve provided in an intake channel of the internal combustion engine;
    an air humidity detector that detects a humidity of air taken in by the internal combustion engine;
    an air temperature detector that detects the temperature of the air;
    an atmospheric pressure detector that detects an ambient pressure of the internal combustion engine as an atmospheric pressure; and
    a controller that controls an engine output on the basis of detection results of the detectors, wherein
    the controller:
    generates humidity information on the air which is taken in by the internal combustion engine, from the humidity detected by the air humidity detector, the temperature detected by the air temperature detector, and the atmospheric pressure detected by the atmospheric pressure detector;
    calculates a dry air partial pressure by correcting the pressure detected by the intake manifold pressure detector, by using the generated humidity information; and
    controls the engine output by taking the pressure detected by the intake manifold pressure detector as a wet air pressure and selecting, according to a control element, either one of the wet air pressure and the dry air partial pressure as a pressure to be used for controlling the engine output.

2. The control device for an internal combustion engine according to claim 1, wherein
    the air humidity detector detects the humidity as a relative humidity, and
    the controller calculates a mole fraction represented by a ratio of the atmospheric pressure and a water vapor partial pressure on the basis of the relative moisture, and takes the calculated mole fraction as the humidity information.

3. The control device for an internal combustion engine according to claim 1, wherein
    when the control element is a fuel injection amount, the controller calculates the fuel injection amount by using the dry air partial pressure.

4. The control device for an internal combustion engine according to claim 2, wherein
    when the control element is a fuel injection amount, the controller calculates the fuel injection amount by using the dry air partial pressure.

5. The control device for an internal combustion engine according to claim 1, wherein
    when the control element is an ignition timing, the controller calculates the ignition timing by using the dry air partial pressure.

6. The control device for an internal combustion engine according to claim 2, wherein
    when the control element is an ignition timing, the controller calculates the ignition timing by using the dry air partial pressure.

7. The control device for an internal combustion engine according to claim 3, wherein
    when the control element is an ignition timing, the controller calculates the ignition timing by using the dry air partial pressure.

8. The control device for an internal combustion engine according to claim 5, wherein
    when the humidity information is higher than a predetermined threshold, the controller corrects the ignition timing to an advance side.

9. The control device for an internal combustion engine according to claim 6, wherein
    when the humidity information is higher than a predetermined threshold, the controller corrects the ignition timing to an advance side.

10. The control device for an internal combustion engine according to claim 7, wherein when the humidity information is higher than a predetermined threshold, the controller corrects the ignition timing to an advance side.

11. The control device for an internal combustion engine according to claim 1, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

12. The control device for an internal combustion engine according to claim 2, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

13. The control device for an internal combustion engine according to claim 3, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

14. The control device for an internal combustion engine according to claim 4, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

15. The control device for an internal combustion engine according to claim 5, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

16. The control device for an internal combustion engine according to claim 6, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

17. The control device for an internal combustion engine according to claim 7, wherein
when the control element is a target throttle opening degree of an electronically controlled throttle, the opening degree of which can be electrically adjusted to adjust an intake air amount, the controller corrects, by using the humidity information, a target intake air amount for realizing a request torque of the internal combustion engine and calculates the target throttle opening degree by using the target intake air amount corrected by the humidity information and the wet air pressure.

18. A control method for an internal combustion engine which is executed by a controller in a control device for an internal combustion engine, the control device including:
an operation state detector that detects an operation state of an internal combustion engine;
an intake manifold pressure detector that detects a pressure in an intake manifold downstream of a throttle valve provided in an intake channel of the internal combustion engine;
an air humidity detector that detects a humidity of air taken in by the internal combustion engine;
an air temperature detector that detects the temperature of the air;
an atmospheric pressure detector that detects an ambient pressure of the internal combustion engine as an atmospheric pressure; and
the controller that controls an engine output on the basis of detection results of the detectors,
the control method comprising the following steps executed by the controller:
a first step for generating humidity information on the air which is taken in by the internal combustion engine, from the humidity detected by the air humidity detector, the temperature detected by the air temperature detector, and the atmospheric pressure detected by the atmospheric pressure detector;
a second step for calculating a dry air partial pressure by correcting the pressure detected by the intake manifold pressure detector by using the humidity information generated in the first step; and
a third step for controlling the engine output by taking the pressure detected by the intake manifold pressure detector as a wet air pressure and selecting, according to a control element, either one of the wet air pressure and the dry air partial pressure as a pressure to be used for controlling the engine output.

* * * * *